(12) United States Patent
Martin et al.

(10) Patent No.: US 10,152,283 B2
(45) Date of Patent: Dec. 11, 2018

(54) HIERARCHICAL ICONS FOR GRAPHICAL USER INTERFACE

(71) Applicant: DOVER EUROPE SARL, Vernier (CH)

(72) Inventors: Elisabeth Martin, Chatuzange le goubet (FR); Fabrice Pracht, Peyrus (FR)

(73) Assignee: Dover Europe Sarl, Vernier (CH)

( * ) Notice: Subject to any disclaimer, the term of this patent is extended or adjusted under 35 U.S.C. 154(b) by 0 days.

(21) Appl. No.: 15/550,738

(22) PCT Filed: Feb. 10, 2016

(86) PCT No.: PCT/EP2016/052854
§ 371 (c)(1),
(2) Date: Aug. 11, 2017

(87) PCT Pub. No.: WO2016/128484
PCT Pub. Date: Aug. 18, 2016

(65) Prior Publication Data
US 2018/0046413 A1 Feb. 15, 2018

Related U.S. Application Data

(60) Provisional application No. 62/116,323, filed on Feb. 13, 2015.

(51) Int. Cl.
*G06F 3/12* (2006.01)
*H04N 1/00* (2006.01)
(Continued)

(52) U.S. Cl.
CPC .......... *G06F 3/1204* (2013.01); *G06F 3/0482* (2013.01); *G06F 3/04817* (2013.01);
(Continued)

(58) Field of Classification Search
CPC .. G06F 3/1204; G06F 3/1253; G06F 3/04817; G06F 3/0482
(Continued)

(56) References Cited

U.S. PATENT DOCUMENTS

| 6,784,925 B1 | 8/2004 | Tomat et al. |
| 2002/0152222 A1 | 10/2002 | Holbrook |

(Continued)

FOREIGN PATENT DOCUMENTS

| JP | 2008304984 | 12/2008 |
| JP | 2014102671 | 6/2014 |

(Continued)

OTHER PUBLICATIONS

International Search Report/Written Opinion for PCT/EP2016/052854 dated Feb. 10, 2016 by European Patent Office.

(Continued)

*Primary Examiner* — Neil R McLean
(74) *Attorney, Agent, or Firm* — Fish & Richardson P.C.

(57) ABSTRACT

Methods, systems, and apparatus, including medium-encoded computer program products, for providing interrelated icons in user interfaces, e.g., for industrial printers, include a method including causing a printing device to print on a substrate in accordance with information provided through a graphical user interface; presenting selectable icons representing functions, associated with the printing device, being in each of two or more levels of a navigable hierarchy; enabling the user to navigate the hierarchy to provide the information; and improving efficiency of the printing device and reducing errors by including two graphical elements simultaneously in at least one of the selectable icons at one of the levels of the hierarchy; where one of the two graphical elements indicates a level of the hierarchy to which the function represented by the icon belongs; and the (Continued)

other one of the two graphical elements simultaneously indicates the function represented by the icon.

18 Claims, 9 Drawing Sheets

(51) Int. Cl.
    *G06F 3/0482*     (2013.01)
    *G06F 3/0481*     (2013.01)

(52) U.S. Cl.
    CPC ....... *G06F 3/1253* (2013.01); *H04N 1/00411* (2013.01); *H04N 1/00424* (2013.01); *H04N 1/00474* (2013.01); *H04N 1/00482* (2013.01); *H04N 1/00506* (2013.01)

(58) Field of Classification Search
    USPC ........................................ 358/1.15
    See application file for complete search history.

(56) References Cited

U.S. PATENT DOCUMENTS

| | | | |
|---|---|---|---|
| 2003/0103232 A1* | 6/2003 | Twede | G06F 3/1204 358/1.15 |
| 2007/0271532 A1 | 11/2007 | Nguyen et al. | |
| 2009/0313586 A1 | 12/2009 | Sharma et al. | |
| 2010/0087230 A1 | 4/2010 | Peh et al. | |
| 2010/0097654 A1* | 4/2010 | Takei | G06F 3/1204 358/1.16 |
| 2011/0035665 A1 | 2/2011 | Kim et al. | |
| 2012/0240083 A1 | 9/2012 | Song et al. | |

FOREIGN PATENT DOCUMENTS

| | | |
|---|---|---|
| JP | 2014142074 | 8/2014 |
| WO | WO14047031 | 3/2014 |

OTHER PUBLICATIONS

International Application No. PCT/EP2016/052854, Notification of Transmittal of the International Preliminary Report on Patentability, dated May 23, 2017, 16 pages.

International Application No. PCT/EP2016/052854, Reply to International Search Report and Written Opinion and Article 19 Amendment, dated Jun. 15, 2016, 18 pages.

* cited by examiner

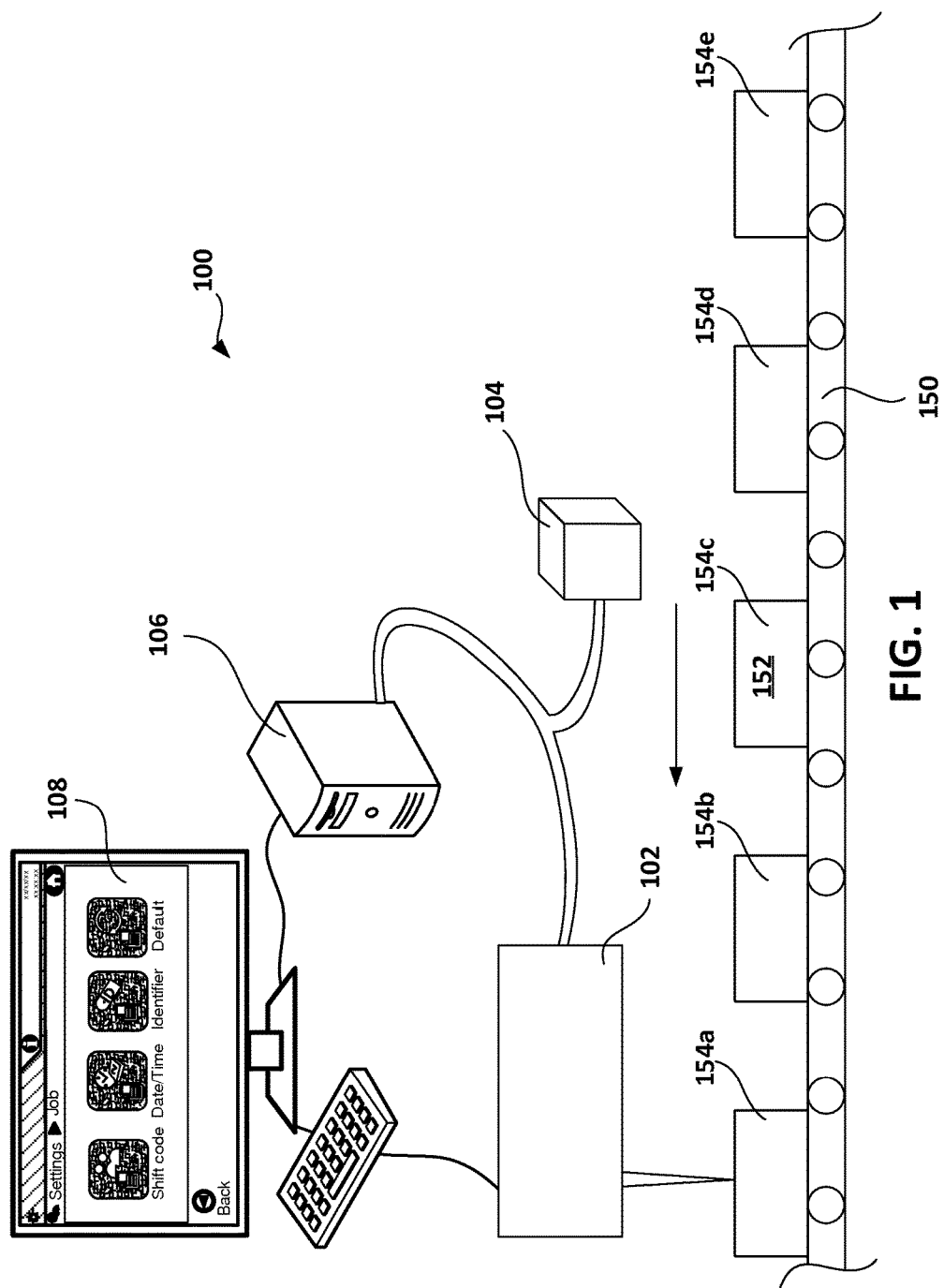

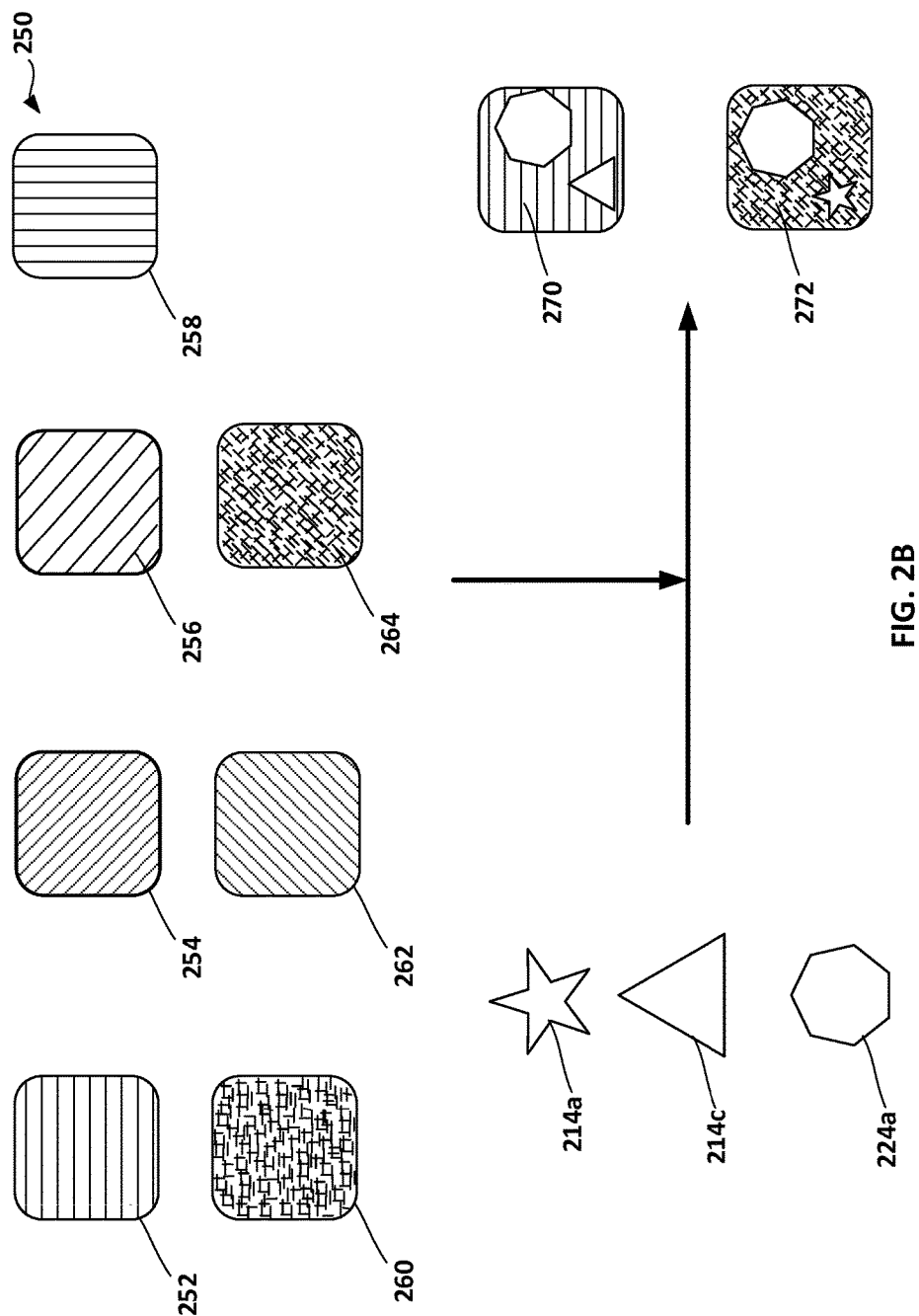

HIERARCHICAL ICONS FOR GRAPHICAL USER INTERFACE

BACKGROUND

This specification relates to icons for user interfaces, such as those that can be used with industrial printers.

An icon in the context of computer user interfaces is a graphical representation of a program or function of a program, which is typically selectable (e.g., an icon can form part of a user interface button corresponding to a software tool). Traditionally, each icon is designed to represent its corresponding program or function with a single picture and no text. This can be helpful in making the icon readily understandable by people around the world who do not speak the same language, as the function that is performed by selection of the interface element with the given icon is readily apparent. Due to this improvement in the ease of operability of the user interface, icons have been used widely in many different types of user interfaces, including user interfaces for industrial printers.

SUMMARY

This specification describes technologies relating to interrelated icons for user interfaces, such as a user interface for industrial printers.

In general, one or more aspects of the subject matter described in this specification can be embodied in one or more methods that include causing a printing device to print on a substrate in accordance with information provided by a user through a graphical user interface of the printing device; in the graphical user interface, presenting selectable icons representing functions associated with the printing device, the functions being in each of two or more levels of a navigable hierarchy of the functions; enabling the user to navigate the hierarchy to provide the information; and improving the efficiency of the printing device and reducing error in the providing of the information by the user by including two graphical elements simultaneously in at least one of the selectable icons at one of the levels of the hierarchy; where one of the two graphical elements indicates for the user a level of the hierarchy to which the function represented by the icon belongs; and the other one of the two graphical elements simultaneously indicates for the user the function represented by the icon.

These are other embodiments can optically include one or more of the following features.

The level of the hierarchy can be a first level of the hierarchy, the improving can include including a color in the at least one of the selectable icons simultaneously with including the two graphical elements, and the color can indicate a second level of the hierarchy. The second level of the hierarchy can be a highest level of the hierarchy.

In general, one or more aspects of the subject matter described in this specification can also be embodied in one or more computer program products, encoded on a computer-readable medium, operable to cause data processing apparatus to perform operations that include presenting a first user interface element having a first icon including a graphical representation of a first functional menu in a user interface of a printing device, the first functional menu being at a first level of the user interface of the printing device; presenting, in response to a selection of the first user interface element, the first functional menu, the first functional menu including: a second user interface element having a second icon including both (a) the graphical representation of the first functional menu, and (b) a graphical representation of a second functional menu in the user interface of the printing device, the second functional menu being at a second level of the user interface of the printing device, and a third user interface element having a third icon including both (a) the graphical representation of the first functional menu, and (b) a graphical representation of a third functional menu in the user interface of the printing device, the third functional menu being at the second level of the user interface of the printing device; and presenting, in response to a selection of either the second user interface element or the third user interface element, either the second functional menu or the third functional menu, respectively.

These are other embodiments can optically include one or more of the following features.

The operations can further include presenting, in response to the selection of the second user interface element, the second functional menu, the second functional menu including: a fourth user interface element having a fourth icon including both (a) the graphical representation of the second functional menu, and (b) a graphical representation of a fourth functional menu in the user interface of the printing device, the fourth functional menu being at a third level of the user interface of the printing device, and a fifth user interface element having a fifth icon including both (a) the graphical representation of the second functional menu, and (b) a graphical representation of a fifth functional menu in the user interface of the printing device, the fifth functional menu being at the third level of the user interface of the printing device. Presenting the first user interface element can include presenting a top level functional menu including the first icon with the first user interface element and one or more additional icons with corresponding additional user interface elements, where each of the first icon and the one or more additional icons have different respective background colors; and where each of the second icon, the third icon, the fourth icon, and the fifth icon have the same background color as that of the first icon.

Presenting the first function menu can include presenting the graphical representation of the first functional menu such that it appears smaller than the graphical representation of the second functional menu.

Presenting the first function menu can include presenting the graphical representation of the first functional menu and the graphical representation of the second functional menu such that they are each differently aligned with respect to the second icon. The graphical representation of the first functional menu can be aligned lower with respect to the second icon than an alignment of the graphical representation of the second functional menu with respect to the second icon.

The data processing apparatus can be part of industrial printer systems employing different printer technologies, and the computer program product can be same graphical representations and icons in user interfaces with each of the industrial printer systems. The different printer technologies can include a laser marking technology and a thermal transfer printing technology.

In general, one or more aspects of the subject matter described in this specification can also be embodied in one or more systems that include an industrial printer system; and a user interface device for the industrial printer system; where the user interface device is designed to present sub-menu icons for user interface elements of a current sub-menu, in which, each of the sub-menu icons includes both a graphical representation of the current sub-menu and a graphical representation of an additional sub-menu reachable by selection of that sub-menu icon's interface element.

These are other embodiments can optically include one or more of the following features.

The user interface device can be further designed to: receive user input indicating a selection of one of the sub-menu icons; determine the additional sub-menu reachable by selection of the selected sub-menu icon; and responsive determining the additional sub-menu reachable by selection of the selected sub-menu icon, present additional sub-menu icons for user interface elements of that additional sub-menu, in which, each of the additional sub-menu icons includes both a graphical representation of the additional sub-menu and a graphical representation of a further sub-menu reachable by selection of that additional sub-menu icon's interface element.

The user interface device can be further designed to: present command icons for user interface elements of the current sub-menu, in which each of the command icons includes both the graphical representation of the current sub-menu and a graphical representation of a command executable by selection of that command icon's interface element; receive user input indicating a selection of one of the command icons; determine the command executable by selection of the selected command icon; and responsive to determining the command executable by selection of the selected command icon, transmit an indication of that command to the industrial printer system for execution. The command can include instructions that, when executed the industrial printer system, cause the industrial printer system to print on a substrate.

The user interface device can be designed to present a first subset of the sub-menu icons according a common color scheme, where the first subset of the sub-menu icons is determined based on a hierarchical relationship between the sub-menu icons of the first subset. The user interface device can be designed to present a second subset of the sub-menu icons according a second common color scheme, where the second subset of the sub-menu icons is determined based on a second hierarchical relationship between the sub-menu icons of the second subset. The first subset of sub-menu icons can be exclusive of the second subset of the sub-menu icons.

Other embodiments of the above aspects include corresponding systems, apparatus, and computer program products.

Particular embodiments of the subject matter described in this specification can be implemented to realize one or more of the following advantages. A user interface can be made easy to use and be understood by anybody in the world with a minimum of level of reading. Navigation through software interfaces can be simplified, where the icons themselves can be both the user interface elements and also graphically represent the path being taken by the user through the user interface. This can include using both icon pictures and colors to visually indicate the location in a user interface hierarchy, as well as the action(s) taken by the user to arrive there. The amount of text needed in a user interface can be reduced, which can reduce translation costs for the user interface when used in multiple different countries. Moreover, the icons can be drawn so as to be generally representative of functions that are applicable to multiple different types of industrial printers and thus can be reused across a wide range of printer products that employ very different printing technologies. This can facilitate the operator to pass from one printer to another without needed to be trained. Further, in some cases, user interfaces having these icons allows users to communicate more clearly and more efficiently with each other regarding the operation of a device. For example, a user operating a device may seek assistance from another user who is remote from the device (e.g., a colleague, a supervisor, or technical support representative). As the user interface of the device can be reused across a wide range of devices, the remote user can assist the user (e.g., by providing instructions or guidance), as long as he is familiar with at least one of the devices having that user interface. Further still, in some cases, user interfaces having these icons can also simplify the creation of instruction manuals and guides, as one or more steps in a procedure can be readily illustrated using the simplified user interfaces.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 1 shows an industrial printer system.

FIG. 2B shows an example of colors used with the system of interrelated icons of FIG. 2A.

Like reference numbers and designations in the various drawings indicate like elements.

DETAILED DESCRIPTION

Figure 2A:
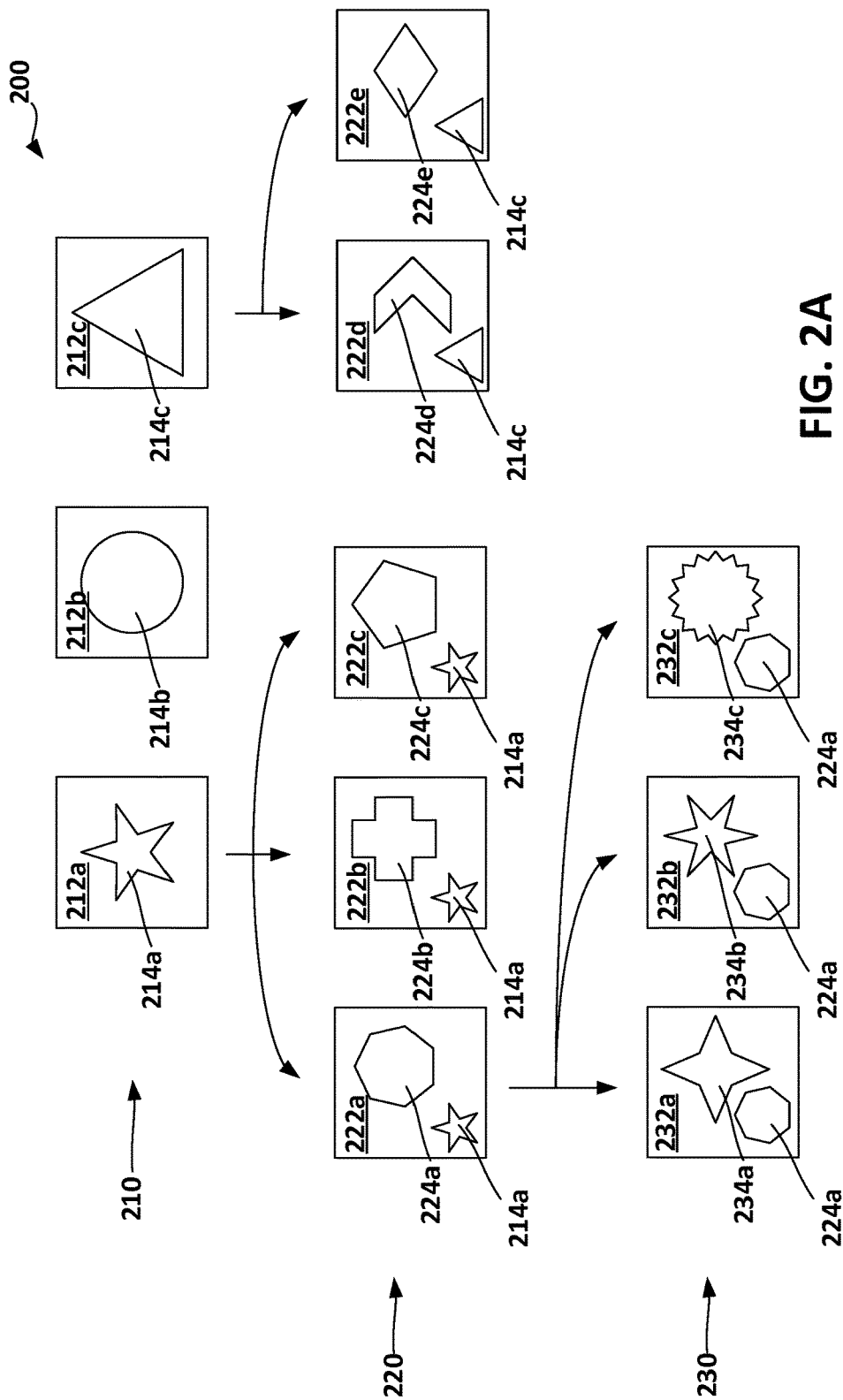
FIG. 2A shows a system of interrelated icons for a user interface of a device.

FIG. 1 shows an example of an industrial printer system 100. The industrial printer system 100 includes a printing device 102, a power source 104, a computer 106, and a user interface 108 on a user interface device. Although the computer and user interface devices are shown as separate desktop computer, keyboard and monitor, it will be appreciated that the computer and one or more interface devices can have multiple different configurations, including potentially being fully integrated together in a single device, as in a tablet computer. Moreover, although wired connections are shown, wireless connections among the various system components are also possible in various implementations.

As a conveyor 150 moves in the direction of the arrow 152, substrates 154a-e move towards the printing device 102. In various implementations, the substrates 154a-e can be sheets of papers, boxes, containers, or other objects in a manufacturing line, or the substrates 154a-e can be portions of a material web that is later applied to papers, boxes, containers, or other objects in a manufacturing line. As each substrate 154a-e passes the printing device 102, the printing device 102 prints information (e.g., text, drawings, patterns, or other markings) onto the substrates 154a-e.

The industrial printer system 100 can print information onto the substrates 154a-e using a variety of different techniques. For example, in various implementations, the industrial printer system 100 can be a thermal transfer printer system, a laser printer system, an ink jet printer system, or a combination thereof. The industrial printer system 100 can include a printing head that applies markings to the substrates 154a-e through thermal transfer (e.g., by melting a material onto the substrate), a laser that creates markings on the substrates 154a-e (e.g., by passing a laser beam over the substrate to ablate a portion of the substrate or activate a material on or in the substrate to create a mark), or an ink jet printing array that applies droplets of ink onto the substrate.

The power source 104 provides electrical power for the industrial printer system 100. Various types of power sources can be used. For example, the power sources 104 can be a remotely located source of power (e.g., an electric generator or a regional electrical grid) and/or receive power from a remotely located source of power. As another example, the power source 104 can include one or more devices that store electric energy (e.g., electrochemical cells or batteries) and release stored electric energy as needed. Although a single power source 104 is shown, in some cases, there may be multiple power sources 104, and each can power one or more of the components of the industrial printer system 100, either individually or in combination with other power sources 104. Moreover, in some implementations, the power source 104 is integrated with a printer 102, rather than being separate from it, as shown.

The computer 106 stores information related to the industrial printer system 100, and controls the operation of the industrial printer system 100. As an example, the computer 106 can transmit commands to each of the components of the industrial printer system 100 in order to instruct those components to perform various functions or tasks. As another example, the computer 106 can store information regarding the industrial printer system 100, including sets of instructions (e.g., software applications), operating parameters (e.g., system settings and user preferences), or any other data related to operating the industrial printer system 100.

The user interface 108 provides a mechanism by which one or more users can interact with the industrial printer system 100. The user interface 108 can be provided, for example, through input/output devices such as a display screen (e.g., an LCD display), a touch-sensitive display screen, indicator lights, buttons, switches, dials, keypads, or combinations thereof. In some cases, the user interface 108 can be provided by or directly connected to the printer 102, which in turn can be communicatively coupled with the computer 106, one or more other computers on a network, or a combination thereof. The user interface 108 presents information regarding the operation of the industrial printer system 100 (e.g., information describing the operational status of the system, and information describing one or more commands that can be executed by the system). The user interface 108 also accepts commands from a user. For example, the user interface 108 can provide the user with one or more commands that can be executed by the user, and can receive input from the user specifying the selection of one or more of the presented commands. The user interface 108 interprets the input, then transmits an indication of the selection to the computer 106 for execution. Once the command is executed by the computer 106, the computer 106 can, for example, cause the industrial printer system 100 to start printing, stop printing, or otherwise modifying the printing operation of the industrial printer system 100.

The user interface 108 can present commands to a user in a variety of ways. For example, the user interface 108 can present each of the commands in the form of a list, a grid, or another ordered arrangement. Each command can be represented using user interface elements such as text (e.g., a textual label that describes the command), images (e.g., an icon that visually represents the command), or combinations thereof. As an example, in some cases, each of at least a subset of available commands (e.g., commands for navigation through a hierarchical menuing system of the user interface 108) can be represented by a unique icon. Upon selection of a particular user interface element by the user, the user interface 108 determines which user interface element was selected, determines which command corresponds with the selected user interface element, and transmits an indication of that command to the computer 106 for execution.

In some cases, the user interface 108 can present information according to a hierarchical menu. For example, a menu of available commands can contain several different hierarchical levels, each containing one or more sub-menus and/or commands. Each of the sub-menus and commands can be organized according to one or more of these hierarchical levels, such that similar or otherwise related commands are grouped together. To access a particular command, the user navigates through the hierarchy of the menu (e.g., by selecting successive sub-menus at each of the hierarchical levels) until he arrives at the desired command. A hierarchical arrangement can be beneficial, for example, if there are several different commands that are available to a user, where some of the commands are more closely related to each other than others. By arranging the commands hierarchically, the commands are presented to the user in an intuitive and organized fashion. In some cases, only a subset of the available commands are presented to the user at any given time (e.g., only commands from a single sub-branch of the hierarchy) such that the number of options that are simultaneously presented to the user are reduced, thereby reducing clutter and increasing the readability of the user interface 108.

In some cases, the user interface 108 can present each of the selections of a hierarchical menu that includes a system of interrelated icons. Each of the interrelated icons can include an indication of a particular selection within the hierarchical menu (e.g., a particular sub-menu or command), and an indication of the relationship between that selection and other selections within other levels of the hierarchical menu. This can be beneficial, for example, as it provides the user with a visual indication of the sub-menu or commands associated with the icon, as well as a visual indication of the relationship between that sub-menu or command with other selections across different hierarchy levels of the hierarchical menu. In some cases, these interrelated icons can be presented without accompany text (e.g., without textual labels or descriptions for each icon). This can be beneficial, for example, as it reduces the clutter and increases the readability of the user interface 108, while reducing translation costs for the user interface 108 when used in multiple different countries.

Moreover, this arrangement can facilitate ease of use by the operator of printing systems when the same user interface 108 is used across multiple different types of industrial printing systems. Note that a manufacturing process may use multiple different printings systems 100 in the same manufacturing facility (e.g., an inkjet printing system to create labels for products, and a laser printing system to mark sell by dates on those products), and workers in that facility may need to operate each of the different printing systems. Thus, having a common user interface, which employs interrelated icons as described herein, for different printing system can reduce the amount of training time needed for workers.

FIG. 2A shows a system of interrelated icons 200, such as can be presented by the user interface 108. At a first hierarchy level 210, the system 200 includes several icons 212*a-c*. Each of the icons 212*a-c* includes a graphical representation 214*a-c*, respectively, that visually indicates a particular selection within a hierarchical menu (e.g., a particular sub-menu or command). Each of the icons 212a-c is unique, such that the user can visually differentiate between each of the icons 212a-c. In this example, the icons 212a and 212c each represent a sub-menu on a second hierarchy level 220, while the icon 212b represents a command. When the user selects the icon 212b, the user interface 108 determines the command associated with the icon 212b, and transmits an indication of the selected command to the computer 106 for execution.

When the user selects the icon 212a, representing a sub-menu at the second hierarchy level 220, the user is presented with several additional icons 222a-c, each representing a different selection within that sub-menu. As above, each of the icons 222a-c includes a graphical representation 224a-c, respectively, that visually indicates a particular selection within a hierarchical menu (e.g., a particular sub-menu or command). However, each of the icons 222a-c also includes the graphical representation 214a, e.g., a smaller version of the previously presented graphical representation 214a, indicating that each of the available selections represented by the icons 222a-c are related to the selection represented by the icon 212a in the first hierarchy level 210. Thus, this allows the user to visually ascertain the relationship between the available selections in the second hierarchy level 220 with a particular one of the selections from the first hierarchy level 210.

In this example, the icon 222a represents a sub-menu on a third hierarchy level 230, while the icons 222b-c each represents a command. When the user selects either of the icons 222b-c, the user interface 108 determines the command associated with the selected icon 222b-c, and transmits an indication of the selected command to the computer 106 for execution.

When the user selects the icon 222a, representing a sub-menu at the third hierarchy level 230, the user is presented with several additional icons 232a-c, each representing a different selection within that sub-menu. In a similar manner as above, each of the icons 232a-c includes a graphical representation 234a-c, respectively, that visually indicates a particular selection within the hierarchical menu (e.g., a particular sub-menu or command). Each of the icons 232a-c also includes the graphical representation 224a, e.g., a smaller version of the previously presented graphical representation 224a, indicating that each of the available selections represented by the icons 232a-c are related to the selection represented by the icon 222a in the second hierarchy level 220. Thus, this allows the user to visually ascertain the relationship between the available selections in the third hierarchy level 230 with a particular one of the selections from the second hierarchy level 220. In a similar manner as above, when the user selects the icons 232a-c, the user interface 108 determines the sub-menu or command associated with the selected icon 232a-c, and either transmits an indication of the selected command to the computer 106 for execution, or presents further icons to the user for selection.

Similarly, when the user selects the icon 212c, representing a different sub-menu at the second hierarchy level 220, the user is presented with additional icons 222d-e, each representing a different selection within that sub-menu. In a similar manner as above, each of the icons 222d-e includes a graphical representation 224d-e, respectively, that visually indicates a particular selection within the hierarchical menu (e.g., a particular sub-menu or command). Each of the icons 222d-e also includes the graphical representation 214c, e.g., a smaller version of the previously presented graphical representation 214c, indicating that each of the available selections represented by the icons 222d-e are related to the selection represented by the icon 212c in the first hierarchy level 210. Thus, this allows the user to visually ascertain the relationship between the available selections in the second hierarchy level 220 with a particular one of the selections from the first hierarchy level 210.

To further indicate the relationship between each of the icons of the system 200, one of more of the icons can be color-coded, such that certain interrelated icons are colored differently than other icons. In some cases, icons can be colored based on their relationship to the uppermost selection in the hierarchical menu. For example, icons 212a, 222a-c, and 232a-c can be colored a first color (e.g., red); icon 212b can be colored a second color (e.g., blue), and icons 212c, and 222d-e can be colored a third color (e.g., green). Thus, by observing the graphical representations contained within the icons as well as the colors of the icons, a user can visually ascertain the relationship between the available selections in the current hierarchy level and those of the hierarchy level above, as well as the relationship between the available selections in the current hierarchy level and those of the uppermost hierarchy level. In some cases, groups of icons can be colored such that icons of one group are exclusive of icons from other groups, such that unique icons and/or colors are used for each group. In some cases, icons can be colored based on other relationships, for example their relationship to a selection other than the uppermost selection in the hierarchical menu (e.g., a selection within a sub-menu at a different higher hierarchical level).

Although three example hierarchy levels 210, 220, and 230 are shown in FIG. 2A, this is merely an illustrative example. In practice, the system 200 can include any number of different hierarchies (e.g., one, two, three, four, five, or more). Further, each of the example icons are shown having a maximum of two graphical representations (i.e., showing information regarding two hierarchy levels), this is also merely an illustrative example. In some cases, icons can include more than two graphical representations (i.e., showing information regarding more than two hierarchy levels). Moreover, in some implementations, each icon can include more than one color indicating more than one level of the hierarchy and/or more than one aspect of the user interface (UI).

FIG. 2B shows an example of colors 250 used with the system of interrelated icons of FIG. 2A. Each icon can be constructed from both the colors 250 and the graphical representations (e.g., graphical representations 214a, 214c, 224a), where the colors indicate a family of menus and/or functions for one or more industrial printers. For example, a blue color 252 can be used to indicate interface elements for a job edition, a forest green color 254 can be used to indicate interface elements for a job in production (or head operations for some printer technologies), another green color 256 can be used to indicate interface elements for a production run, a light purple/pink color 258 can be used to indicate interface elements for actions management, a darker purple color 260 can be used to indicate interface elements for history information, a yellow color 262 can be used to indicate interface elements for settings of the industrial printer, and an orange color 264 can be used to indicate interface elements for services.

Other associations between colors and groups of menus and/or functions can also be used in various implementations. In addition, black and white can also be used (e.g., to indicate external services and UI home, respectively). Further, different shapes of the user interface elements (e.g., user selectable buttons on a touch screen display) can be used to indicate different features of the user interface. Moreover, the graphical representations discussed above in connection with FIG. 2A can span different parts of the user interface.

For example, each user interface element 270, 272 in the user interface can have its own icon (e.g., bitmap or PNG file) constructed from a set of source colors 250 and graphical representations that can be selected based on the location in the user interface that each respective user interface element 270, 272 will be presented, and a common aspect of the different user interface elements 270, 272 can be represented by the graphical representations, such as graphical representations 214a, 214c, 224a. Thus, a first user interface element 270 can have color 252 (e.g., to indicate it is in a "job" portion of the user interface), a small version of the graphical representation 214c to indicate a general category of the current user interface location and/or the place from which the user just came in the user interface, and also the graphical representation 224a to indicate the general nature of the function of the first user interface element 270. Likewise, a second user interface element 272 can have the same graphical representation 224a to indicate the same general function for the second user interface element 272, albeit with appropriate differences based on the current context with the user interface, as indicated by the small version of the graphical representation 214a to indicate the general category of the current user interface location and/or the place from which the user just came in the user interface, and also the color 264 to indicate the different overall context (e.g., to indicate the user is in the "services" portion of the user interface).

Figure 3A:
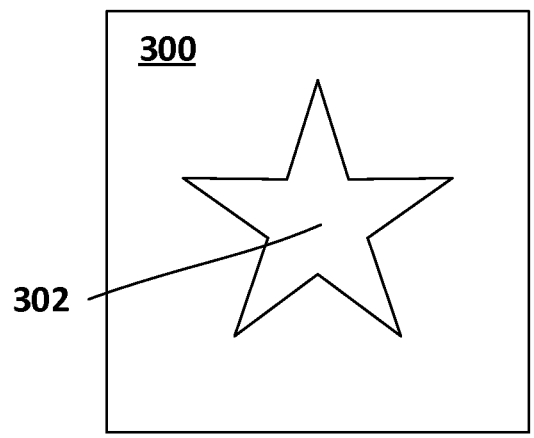
FIGS. 3A-B show an example of interrelated icons.

In some cases, each of the icons of the system can be generated according to standardized conventions, thus providing a common look and feel among the various portions of the user interface, and thereby facilitating quick apprehension of the current UI context. For example, FIG. 3A shows an example icon 300 representing a selection of a first hierarchy level of a hierarchical menu. The icon 300 includes a graphical representation 302 that visually indicates a particular selection within the hierarchical menu (e.g., a particular sub-menu or command). The graphical representation 302 can have a particular spatial alignment with respect to the icon 300 (e.g., centered within the icon 300), and can be sized based on the size of the icon 300 (e.g., having 80% of the size of the icon 300 along a dimension).

Figure 3B:
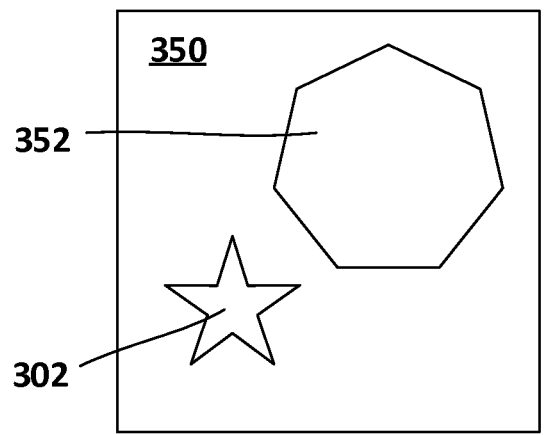

As another example, FIG. 3B shows an example icon 350 representing a selection of a second hierarchy level of a hierarchical menu, and where icon 350 is related to the icon 300. The icon 350 includes a graphical representation 352 that visually indicates a particular selection within the hierarchical menu (e.g., a particular sub-menu or command). The icon 350 also includes the graphical representation 302 that visually indicates the selection in the hierarchy above. The graphical representation 352 can have a particular spatial alignment with respect to the icon 350 (e.g., aligned to the upper right of the icon 350), and can be sized based on the size of the icon 350 (e.g., having 50% of the size of the icon 350). In the icon 350, the graphical representation 302 can have a different spatial alignment with respect to the icon 350 than with respect to icon 300 (e.g., aligned to the bottom left of the icon 350). Likewise, in the icon 350, the graphical representation 302 can have a different size with respect to the icon 350 than with respect to icon 300 (e.g., having 25% of the size of the icon 350).

Although example alignments for graphical representations are described above, these are merely illustrative examples. In some cases, graphical representations can be aligned differently (e.g., having left, right, top, and/or bottom alignment), and can be spaced (e.g., "padded") from the borders of an icon by a relative amount (e.g., having 5% padding, 10% padding, 15% padding, or any other relative amount of padding) or by an absolute amount (e.g., having 5 pixel padding, 10 pixel padding, 15 pixel padding, or any other absolute about of padding). Likewise, although example sizes for graphical representations are described above, these are also merely illustrative examples. In some cases, graphical representations can be sized differently, and can have either a size relative to the size of the icon (e.g., having a dimension 10%, 20% or 30% of a dimension of an icon, or any other relative size), or an absolute size (e.g., having a dimension of 10 pixels, 20 pixels, 30 pixels, or any other absolute size). Further, although example colors are described above, these are also merely illustrative examples. In some cases, icons can have colors include red, orange, yellow, green, blue, violet, black, brown, gray, any other color, or any combinations thereof. Further still, although example graphical representations are shown above, these are also merely illustrative examples. In some cases, graphical representations can include any other shape, drawing, image, pattern, or combinations thereof.

Figure 4A:
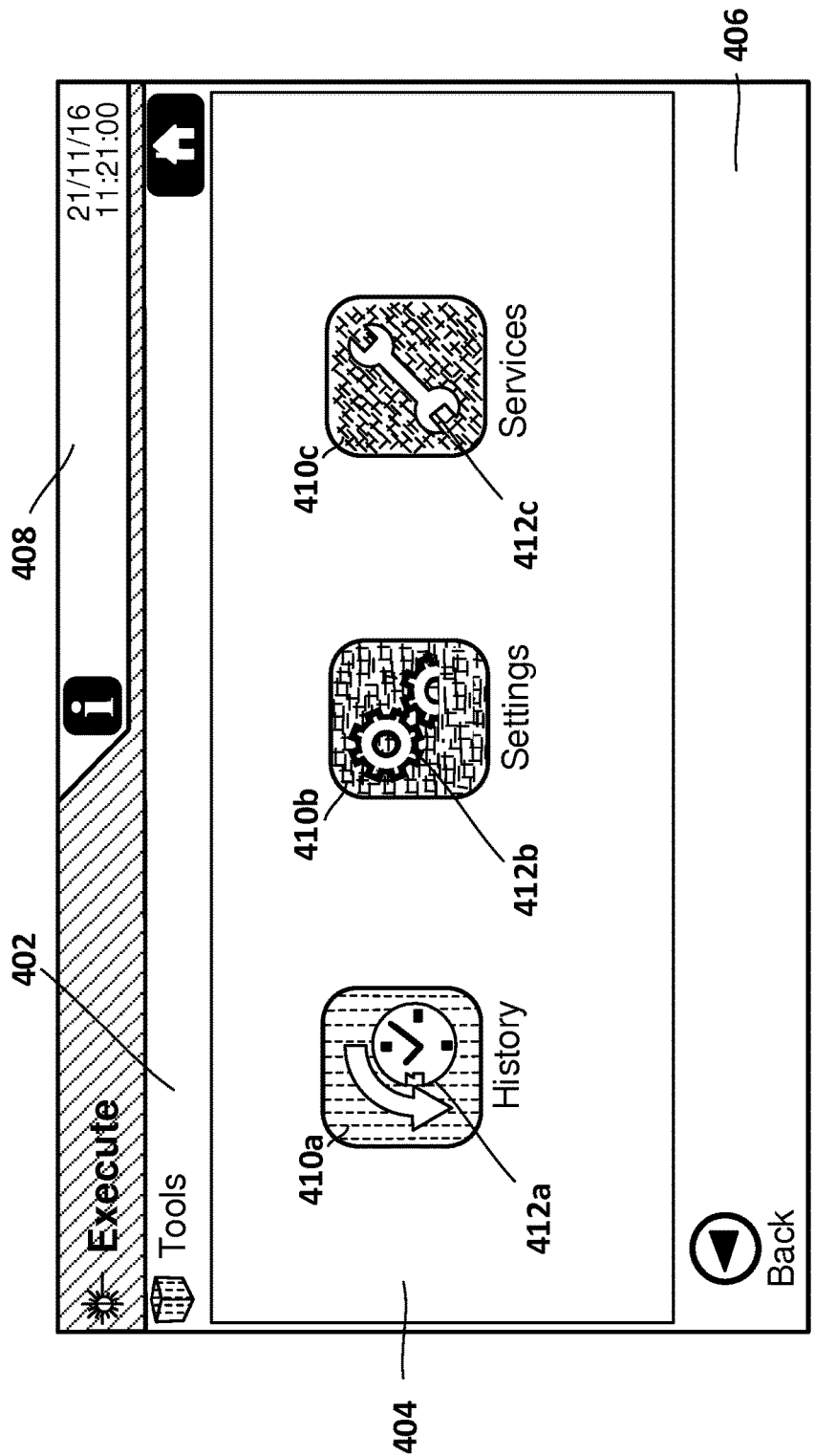
FIGS. 4A-E show an example of a user interface and a system of interrelated icons.
Figure 4B:
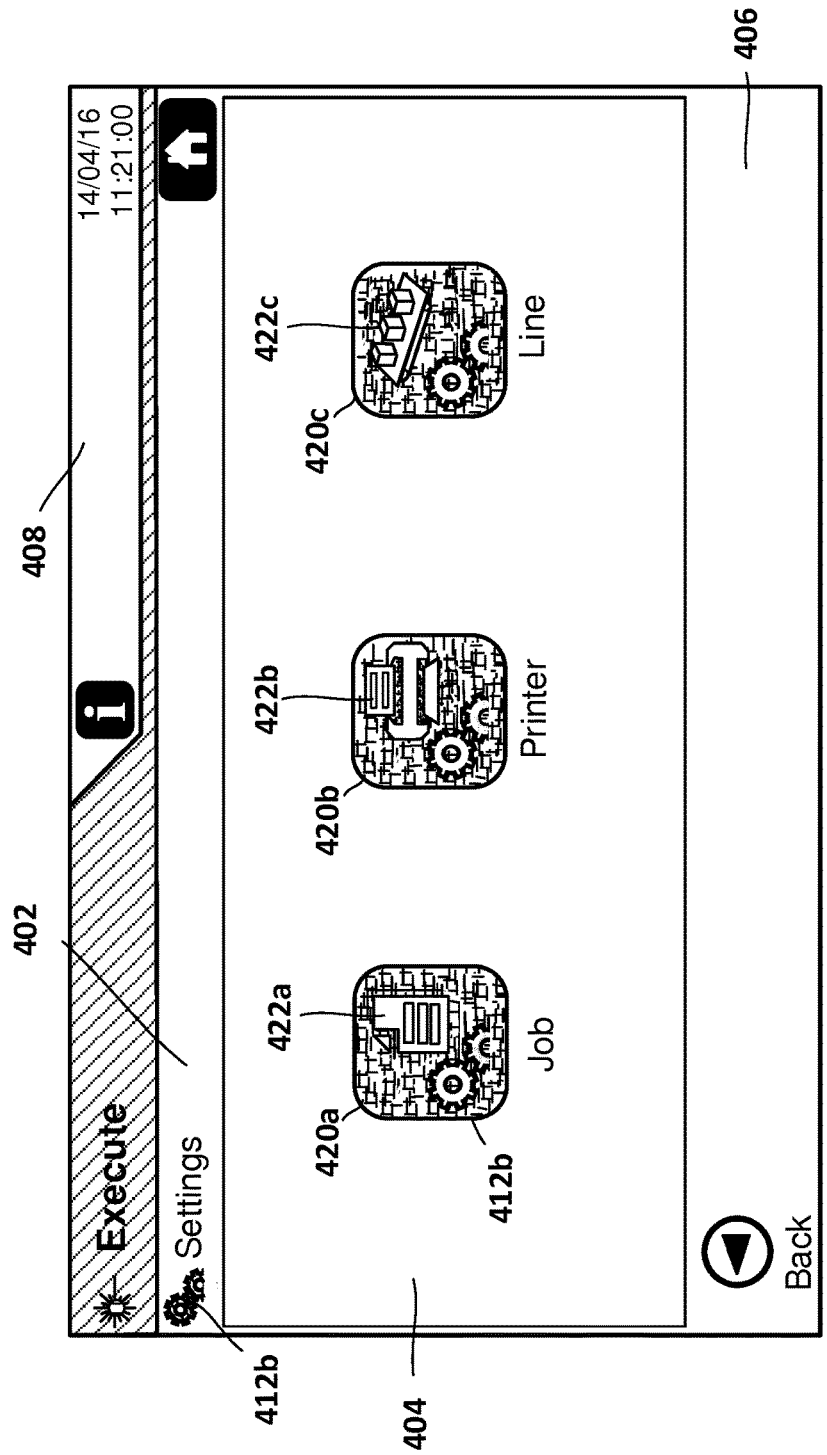
Figure 4C:
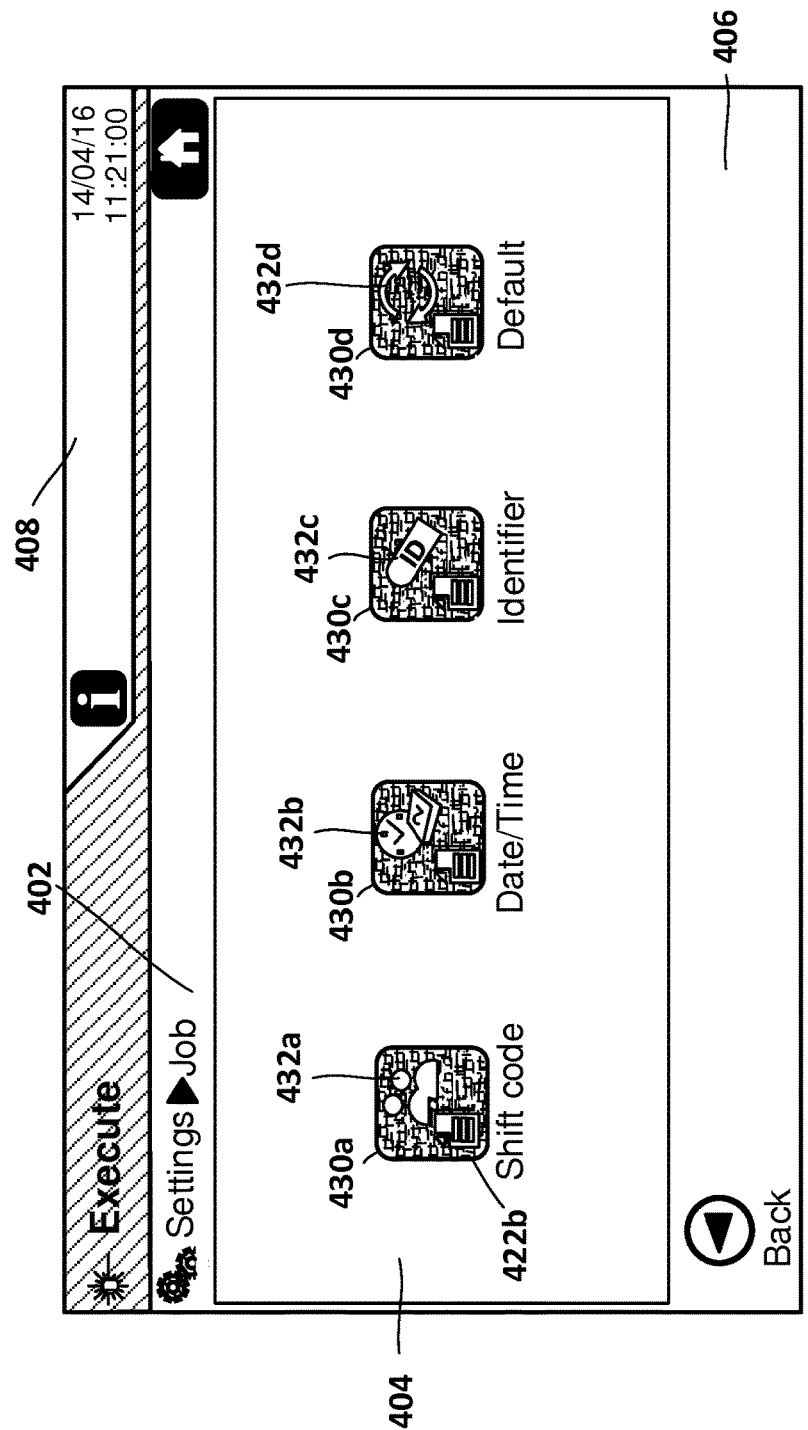
Figure 4D:
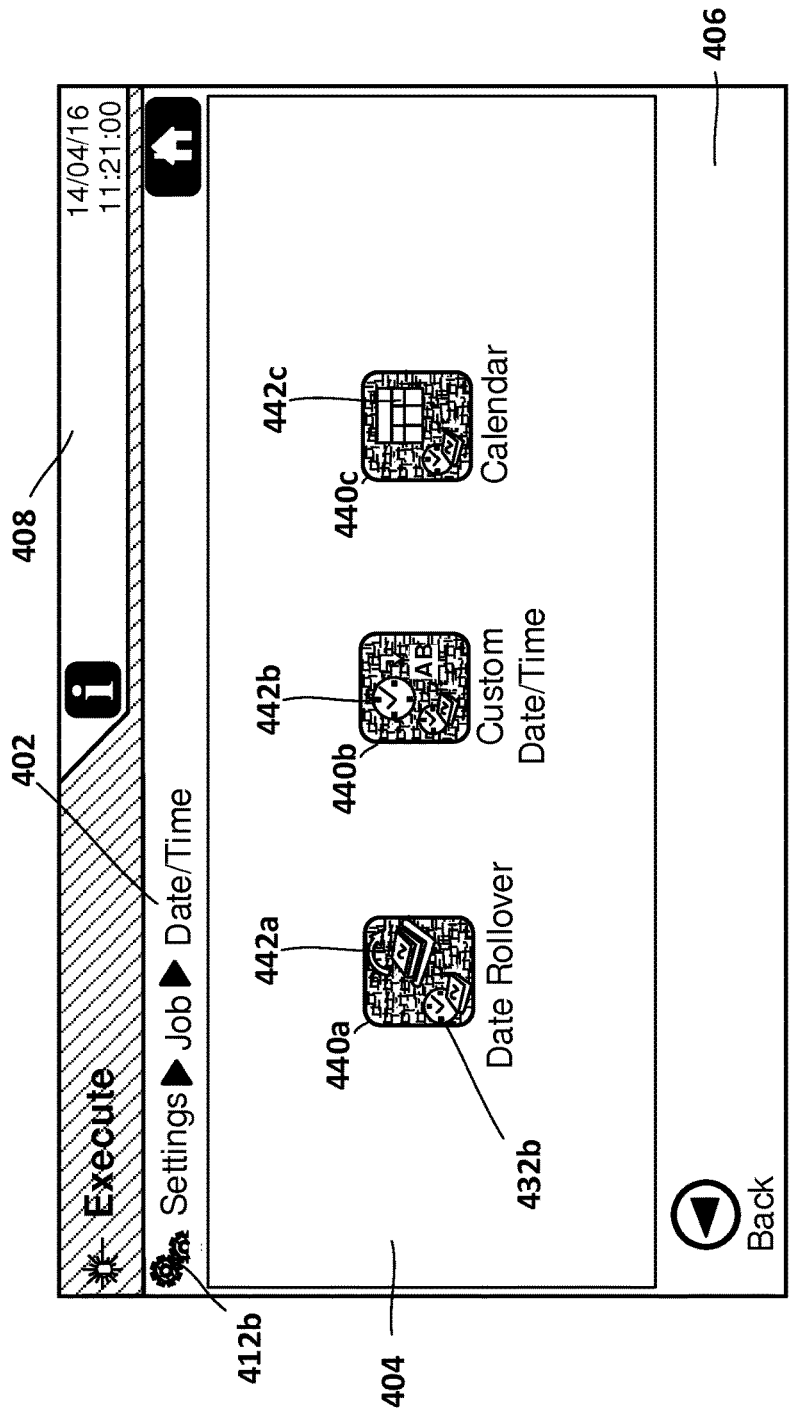
Figure 4E:
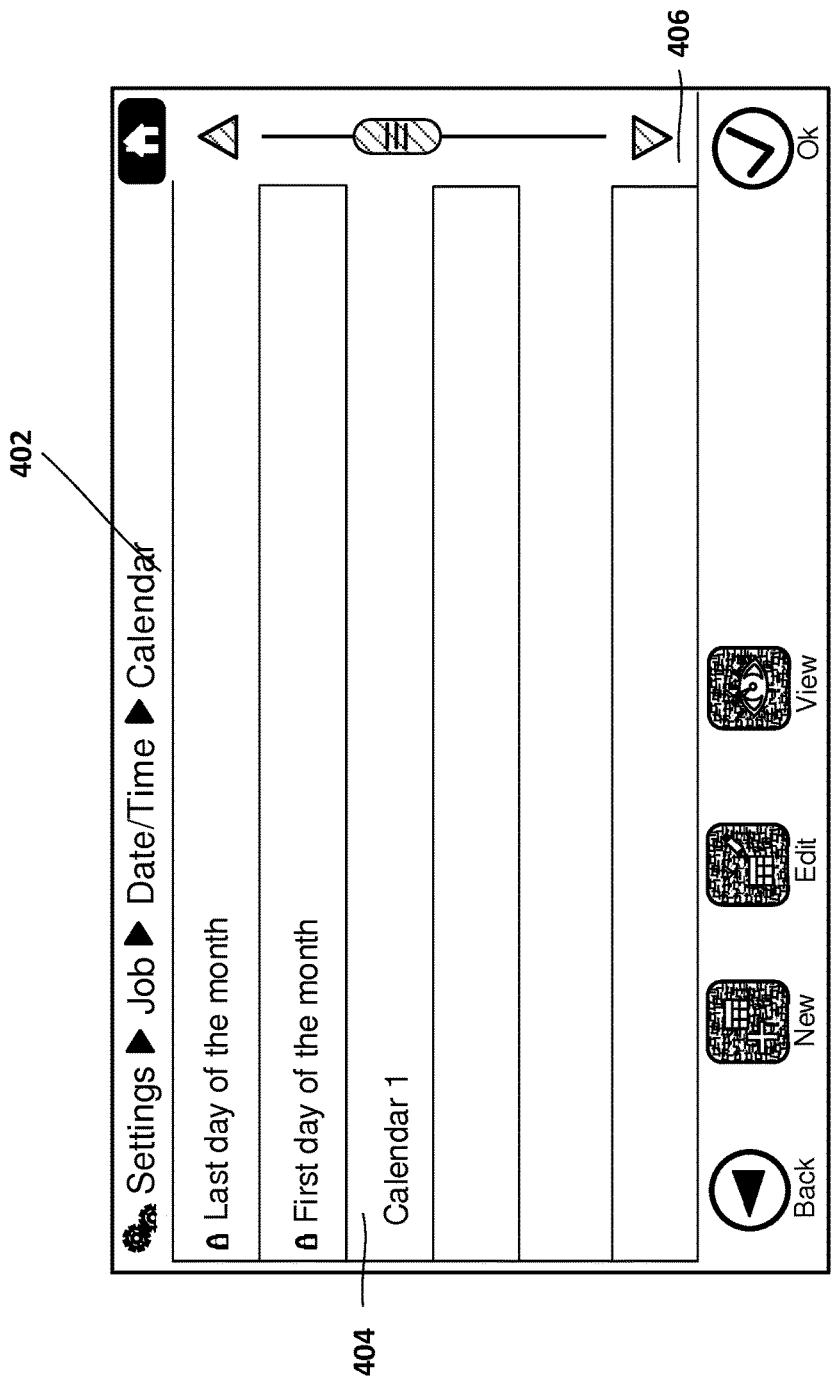

Another example implementation of a user interface and system of interrelated icons is shown in FIGS. 4A-E. Referring to FIG. 4A, the user interface includes a path bar 402, a presentation region 404, a taskbar 406, and a status bar 408.

The status bar 408 is positioned along the top of the user interface, and displays information regarding the status of the system, for example, the current system time and system date. The path bar 402 is positioned below the status bar 408, and displays an indication of the current hierarchical location of the user interface. For example, referring to FIG. 4A, the path bar 402 indicates that the current hierarchical location is a sub-menu entitled "Tools."

The presentation region 404 is positioned below the path bar 402, and presents icons of the system. Each of the icons presented within the presentation region 404 represent sub-menus or commands that are located within the current hierarchical location of user interface. For example, referring to FIG. 4A, the presentation region 404 includes three icons 410a-c, representing a sub-menus entitled "History," "Settings," and "Services," respectively, within the "Tools" sub-menu. Each of the icons 410a-c includes a graphical representation 412a-c, respectively, that illustrates its respective sub-menu. For example, the icon 410a includes a graphical representation 412a depicting a clock, the icon 410b includes a graphical representation 412b depicting a set of gears, and the icon 410c includes a graphical representation 412c depicting a wrench.

The taskbar 406 is positioned along the bottom of the user interface, and displays icons representing additional commands, features, and functions that are available to the user. For example, referring to FIG. 4A, the taskbar 406 presents a "Back" command to the user that allows the user to navigate backwards (e.g., reverse a selection) within the user interface. In some cases, the taskbar 406 can represent commands, features, and functions differently in order to better differentiate between them. As an example, in some cases, commands such as navigation commands can be represented by a circular icon, while functions related to creating new data items, editing existing data items, and viewing existing data items (e.g., "new," "edit," and "view" functions) can be represented by square icons (e.g., with rounded corners). In practice, other distinguishing characteristics (e.g., colors, shapes, and sizes) also can be used, depending on the implementation.

When the user selects one of the icons 410a-c, the user interface updates to reflect the selection. For example, referring to FIG. 4B, when the user selects the icon 410b (representing the "Settings" sub-menu), the path bar 402 updates to reflect the selection (e.g., by replacing "Tools" with "Settings" and displaying the graphical representation 412b, a set of gears). The representation region 404 also updates to reflect the available selections within the "Settings" sub-menu. For example, referring to FIG. 4B, the presentation region 404 updates to include three icons 420a-c, representing a sub-menus entitled "Job," "Printer," and "Line," respectively, within the "Settings" sub-menu. Each of the icons 420a-c includes a graphical representation 422a-c, respectively, that illustrates its respective sub-menu. For example, the icon 420a includes a graphical representation 422a depicting a sheet of paper, the icon 420b includes a graphical representation 422b depicting a printer, and the icon 420c includes a graphical representation 422c depicting a line of production. Each of the icons 420a-c also includes the graphical representation 412b that illustrates its selection made in the hierarchy level above. For example, the icon 420a includes the graphical representation 412b depicting the set of gears, which reflects that the sub-menu presented by user interface is within the "Settings" sub-menu.

Similarly, when the user selects one of the icons 420a-c, the user interface updates to reflect the selection. For example, referring to FIG. 4C, when the user selects the icon 420a (representing the "Job" sub-menu), the path bar 402 updates to reflect the selection (e.g., by updating the hierarchical location of the user interface to include the "Jobs" sub-menu). The representation region 404 also updates to reflect the available selections within the "Jobs" sub-menu. For example, referring to FIG. 4C, the presentation region 404 updates to include three icons 430a-d, representing a sub-menus entitled "Shift Code," "Date/Time," "Identifier," and "Default," respectively, within the "Jobs" sub-menu. In a similar manner as above, each of the icons 430a-d includes a graphical representation 432a-d, respectively, that illustrates its respective sub-menu. For example, the icon 430a includes a graphical representation 432a depicting a pair of people, the icon 430b includes a graphical representation 432b depicting a clock and calendar, the icon 430c includes a graphical representation 432c depicting a tag, and the icon 430d includes a graphical representation 432d depicting a circular set of arrows. Each of the icons 430a-c also includes the graphical representation 422b that illustrates its selection made in the hierarchy level above. For example, the icon 430a includes the graphical representation 422b depicting the sheet of paper, which reflects that the sub-menu presented by user interface is within the "Jobs" sub-menu.

Similarly, when the user selects one of the icons 430a-d, the user interface updates to reflect the selection. For example, referring to FIG. 4D, when the user selects the icon 430b (representing the "Date/Time" sub-menu), the path bar 402 updates to reflect the selection (e.g., by updating the hierarchical location of the user interface to include the "Date/Time" sub-menu). The representation region 404 also updates to reflect the available selections within the "Jobs" sub-menu. For example, referring to FIG. 4D, the presentation region 404 updates to include three icons 440a-c, representing commands entitled "Date Rollover," "Custom Date/Time," and "Calendar," respectively, within the "Date/Time" sub-menu. In a similar manner as above, each of the icons 440a-c includes a graphical representation 442a-d, respectively, that illustrates its respective sub-menu. Each of the icons 440a-c also includes the graphical representation 432b that illustrates its selection made in the hierarchy level above. For example, the icon 440a includes the graphical representation 432b depicting the clock and calendar, which reflects that the sub-menu presented by user interface is within the "Date/Time" sub-menu.

When the user selects one of the icons 440a-c, the user interface again updates to reflect the selection. For example, referring to FIG. 4E, when the user selects the icon 440c (representing the "Calendar" command), the path bar 402 updates to reflect the selection (e.g., by updating the hierarchical location of the user interface to include the "Calendar" command). The representation region 404 also updates to reflect display the result of the executed command (e.g., input and/or output when a "Calendar" application module is executed). The taskbar 406 also updates to reflect commands that are available as a result of the execute command (e.g., commands that are available to the user within the "Calendar" application module").

Thus, a user can observe the graphical representations contained within each of the icons presented in the user interface in order to discern between the currently available selections, and identify the hierarchy level immediate above the current hierarchy level.

As discussed above, each of the icons presented by the user interface can be color coded. For example, icon 410a can be colored a first color (e.g., purple); icon 410b can be colored a second color (e.g., yellow); and icon 410c can be colored a third color (e.g., orange). As each of the icons are 420a-c, 430a-d, and 440a-c are related to and located hierarchically below the icon 410a, each of these icons can be colored similarly as icon 410a (e.g., yellow). Thus, a user can observe the color of the icons presented in the user interface in order to identify the icons' relationships to the uppermost selection in the hierarchical menu.

Although FIGS. 4A-E show an example implementation of a user interface and the system of interrelated icons, in practice, other implementations are also possible. For example, in some implementations, the user interface does not include a text label for one or more of the icons (e.g., one or more sub-menus or commands can be represented only by an icon). As another example, in some implementations, one of more of the elements of the user interface (e.g., the path bar 402, presentation region 404, taskbar 406, and/or status bar 408) can have a different size, appearance, or arrangement, or can be excluded from the user interface. Likewise, although example icons, colors, sub-menus, and commands are described and illustrated above, these are also merely illustrative examples. In practice, other icons, colors, sub-menus, and/or commands are possible, depending on the implementation.

Further, although example implementations are described in the context of industrial printer systems, embodiments of the subject matter can be implemented in connection with other devices. For example, in some cases, a system of interrelated icons can be implemented for consumer printer systems (e.g., personal laser printers and inkjet printers), desktop computer systems, server computer systems, smartphones, watches, personal data assistants (PDAs), mobile electronic devices, calculators, televisions, appliances (e.g., refrigerators, microwaves, ovens, dishwashers, coffee makers, washing machines, dryers, and toasters), thermostats, vehicle control systems (e.g., in-dash entertainment and navigation units), electrical tools, industrial machines, or any other devices where a user might interact with the device through a user interface.

In some cases, a similar system of interrelated icons can be used across multiple different devices (e.g., multiple different industrial printer systems, consumer printer systems, computer systems, appliances, or other devices), such that a similar navigation system is presented to users across each of these devices, even if the devices do not share a common specification. As an example, in some cases, a similar or the same system of interrelated icons can be used across multiple different devices, where at least some of the devices are of a different make, model, or type, or have a different feature set than other devices. Despite these differences in the devices, the user can be presented with a similar or the same system of interrelated icons, such that he has a similar or same user experience across each of the devices.

In some cases, one of more icons can be displayed differently, depending on whether the sub-menu or command that it represents is available to the user for selection. For example, in some cases, icons representing inactive sub-menus or commands can be colored differently (e.g., gray) compared to those that are representing active sub-menus or commands (e.g., colored). Further, in some cases, one or more icons can be presented differently when the icon is selected, in order to provide visual feedback to the user that the desired icon has been selected. In some cases, the icon can be moved by a particular number of pixels (e.g., one, two, three, or more pixels) in one or more directions (e.g., up or down, and/or left or right), colored differently (e.g., having a particular background color) or presented having other visual features (e.g., having a particular border) when selected.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, watch, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   causing a printing device to print on a substrate in accordance with information provided by a user through a graphical user interface of the printing device;
   in the graphical user interface, presenting selectable icons representing functions associated with the printing device, the functions being in each of two or more levels of a navigable hierarchy of the functions associated with the printing device;
   enabling the user to navigate the hierarchy of the functions associated with the printing device to provide the information to the printing device; and
   improving the efficiency of the printing device and reducing error in the providing of the information by the user by including two graphical elements simultaneously in at least one of the selectable icons at one of the levels of the hierarchy;
   wherein one of the two graphical elements indicates for the user a level of the hierarchy of the functions associated with the printing device to which the function represented by the icon belongs; and
   the other one of the two graphical elements simultaneously indicates for the user the function associated with the printing device represented by the icon.

2. The method of claim 1, wherein the level of the hierarchy of the functions associated with the printing device is a first level of the hierarchy of the functions associated with the printing device, the improving comprises including a color in the at least one of the selectable icons simultaneously with including the two graphical elements, and the color indicates a second level of the hierarchy of the functions associated with the printing device.

3. The method of claim 2, wherein the second level of the hierarchy of the functions associated with the printing device is a highest level of the hierarchy of the functions associated with the printing device.

4. A non-transitory computer-readable medium encoding a computer program product operable to cause data processing apparatus to perform operations comprising:
   presenting a first user interface element having a first icon comprising a graphical representation of a first functional menu in a user interface of a printing device, the first functional menu being at a first level of the user interface of the printing device;
   presenting, in response to a selection of the first user interface element, the first functional menu, the first functional menu including
      a second user interface element having a second icon comprising both (a) the graphical representation of the first functional menu, and (b) a graphical representation of a second functional menu in the user interface of the printing device, the second functional menu being at a second level of the user interface of the printing device, and
      a third user interface element having a third icon comprising both (a) the graphical representation of the first functional menu, and (b) a graphical representation of a third functional menu in the user interface of the printing device, the third functional menu being at the second level of the user interface of the printing device; and
   presenting, in response to a selection of either the second user interface element or the third user interface element, either the second functional menu or the third functional menu, respectively.

5. The non-transitory computer-readable medium of claim 4, the operations further comprising presenting, in response to the selection of the second user interface element, the second functional menu, the second functional menu including
   a fourth user interface element having a fourth icon comprising both (a) the graphical representation of the second functional menu, and (b) a graphical representation of a fourth functional menu in the user interface of the printing device, the fourth functional menu being at a third level of the user interface of the printing device, and a fifth user interface element having a fifth icon comprising both (a) the graphical representation of the second functional menu, and (b) a graphical representation of a fifth functional menu in the user interface of the printing device, the fifth functional menu being at the third level of the user interface of the printing device.

6. The non-transitory computer-readable medium of claim 5, wherein presenting the first user interface element comprises presenting a top level functional menu including the first icon with the first user interface element and one or more additional icons with corresponding additional user interface elements, wherein each of the first icon and the one or more additional icons have different respective background colors; and wherein each of the second icon, the third icon, the fourth icon, and the fifth icon have the same background color as that of the first icon.

7. The non-transitory computer-readable medium of claim 4, wherein presenting the first function menu comprises presenting the graphical representation of the first functional menu such that it appears smaller than the graphical representation of the second functional menu.

8. The non-transitory computer-readable medium of claim 4, wherein presenting the first function menu comprises presenting the graphical representation of the first functional menu and the graphical representation of the second functional menu such that they are each differently aligned with respect to the second icon.

9. The non-transitory computer-readable medium of claim 8, wherein the graphical representation of the first functional menu is aligned lower with respect to the second icon than an alignment of the graphical representation of the second functional menu with respect to the second icon.

10. The non-transitory computer-readable medium of claim 4, wherein the data processing apparatus are part of industrial printer systems employing different printer technologies, and the computer program product uses same graphical representations and icons in user interfaces with each of the industrial printer systems.

11. The non-transitory computer-readable medium of claim 10, wherein the different printer technologies comprise a laser marking technology and a thermal transfer printing technology.

12. A system comprising:
an industrial printer system; and
a user interface device for the industrial printer system;
wherein the user interface device is designed to present sub-menu icons for user interface elements of a current sub-menu, in which, each of the sub-menu icons comprises both a graphical representation of the current sub-menu and a graphical representation of an additional sub-menu reachable by selection of that sub-menu icon's interface element.

13. The system of claim 12, wherein the user interface device is further designed to:
receive user input indicating a selection of one of the sub-menu icons;
determine the additional sub-menu reachable by selection of the selected sub-menu icon; and
responsive determining the additional sub-menu reachable by selection of the selected sub-menu icon, present additional sub-menu icons for user interface elements of that additional sub-menu, in which, each of the additional sub-menu icons comprises both a graphical representation of the additional sub-menu and a graphical representation of a further sub-menu reachable by selection of that additional sub-menu icon's interface element.

14. The system of claim 12, wherein the user interface device is further designed to:
present command icons for user interface elements of the current sub-menu, in which each of the command icons comprises both the graphical representation of the current sub-menu and a graphical representation of a command executable by selection of that command icon's interface element;
receive user input indicating a selection of one of the command icons;
determine the command executable by selection of the selected command icon; and
responsive to determining the command executable by selection of the selected command icon, transmit an indication of that command to the industrial printer system for execution.

15. The system of claim 14, wherein the command comprises instructions that, when executed the industrial printer system, cause the industrial printer system to print on a substrate.

16. The system of claim 12, wherein the user interface device is designed to present a first subset of the sub-menu icons according a common color scheme, where the first subset of the sub-menu icons is determined based on a hierarchical relationship between the sub-menu icons of the first subset.

17. The system of claim 16, wherein the user interface device is designed to present a second subset of the sub-menu icons according a second common color scheme, where the second subset of the sub-menu icons is determined based on a second hierarchical relationship between the sub-menu icons of the second subset.

18. The system of claim 17, wherein the first subset of sub-menu icons is exclusive of the second subset of the sub-menu icons.

\* \* \* \* \*